(12) United States Patent
Kabir et al.

(10) Patent No.: US 12,158,403 B2
(45) Date of Patent: Dec. 3, 2024

(54) DEVICES AND METHODS FOR EXTRACTION OF ANALYTES

(71) Applicants: The Florida International University Board of Trustees, Miami, FL (US); Universita' Degli Studi "G. d'Annunzio" Chieti-Pescara, Chieti (IT)

(72) Inventors: Abuzar Kabir, Miami, FL (US); Kenneth G. Furton, Miami, FL (US); Marcello Locatelli, Chieti (IT); Angela Tartaglia, Chieti (IT)

(73) Assignees: The Florida International University Board of Trustees, Miami, FL (US); Universita' Degli Studi "G. d'Annunzio" Chieti-Pescara, Chieti (IT)

( * ) Notice: Subject to any disclaimer, the term of this patent is extended or adjusted under 35 U.S.C. 154(b) by 295 days.

(21) Appl. No.: 18/045,640

(22) Filed: Oct. 11, 2022

(65) Prior Publication Data
US 2024/0118179 A1    Apr. 11, 2024

(51) Int. Cl.
*G01N 1/34* (2006.01)
*G01N 1/38* (2006.01)

(52) U.S. Cl.
CPC ............. *G01N 1/34* (2013.01); *G01N 1/38* (2013.01); *G01N 2001/381* (2013.01); *G01N 2001/386* (2013.01)

(58) Field of Classification Search
None
See application file for complete search history.

(56) References Cited

U.S. PATENT DOCUMENTS

| | | | |
|---|---|---|---|
| 8,294,087 B2 | 10/2012 | Eikel et al. | |
| 10,352,833 B2 | 7/2019 | Kabir et al. | |
| 2007/0287198 A1* | 12/2007 | LaBorde | G01N 33/54326 436/524 |
| 2008/0090305 A1* | 4/2008 | Day | G01N 33/54388 422/68.1 |

(Continued)

FOREIGN PATENT DOCUMENTS

EP       1673168       3/2011

OTHER PUBLICATIONS

Gerstel certified Supplies, Twister / Stir Bar Sorptive Extraction SBSE, Global Analytical Solutions, Ver. Oct. 28, 2015, 8 pages.

(Continued)

*Primary Examiner* — Patrick Assouad
*Assistant Examiner* — Mark A Shabman
(74) *Attorney, Agent, or Firm* — SALIWANCHIK, LLOYD & EISENSCHENK

(57) ABSTRACT

Devices and methods for use in extraction procedures of analytes (organic and inorganic, including heavy metals) from matrices (e.g., complex matrices) in various fields (e.g., biological, clinical, chemical, environmental, toxicological, and forensic) are provided. The device can comprise a support structure acting as a rigid and stable support for extraction materials that can be inserted thereinto. The device can comprise a plurality of windows in the support structure through which the extraction materials can be exposed. The device can include two portions that can join together (e.g., using an interlocking system).

1 Claim, 14 Drawing Sheets

(56) References Cited

U.S. PATENT DOCUMENTS

2011/0203995 A1* 8/2011 Persson ................ B01F 27/811
                    210/683
2018/0207863 A1* 7/2018 Porter .................... B29C 64/40

OTHER PUBLICATIONS

Frank David et al., Stir bar sorptive extraction for trace analysis, Journal of Chromatography A, 1152, pp. 54-69, 2007, 16 pages.

* cited by examiner

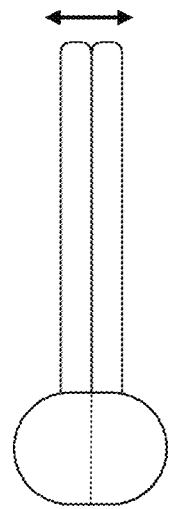 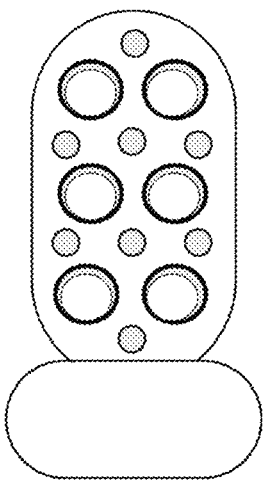 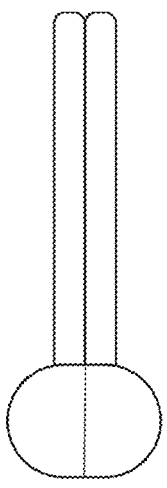 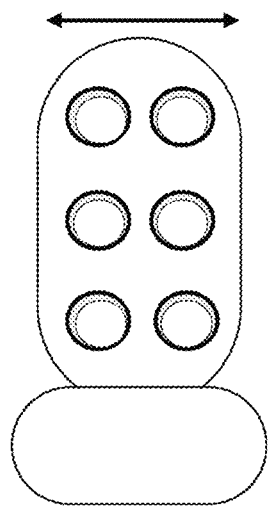
FIG. 5A     FIG. 5B     FIG. 5C     FIG. 5D
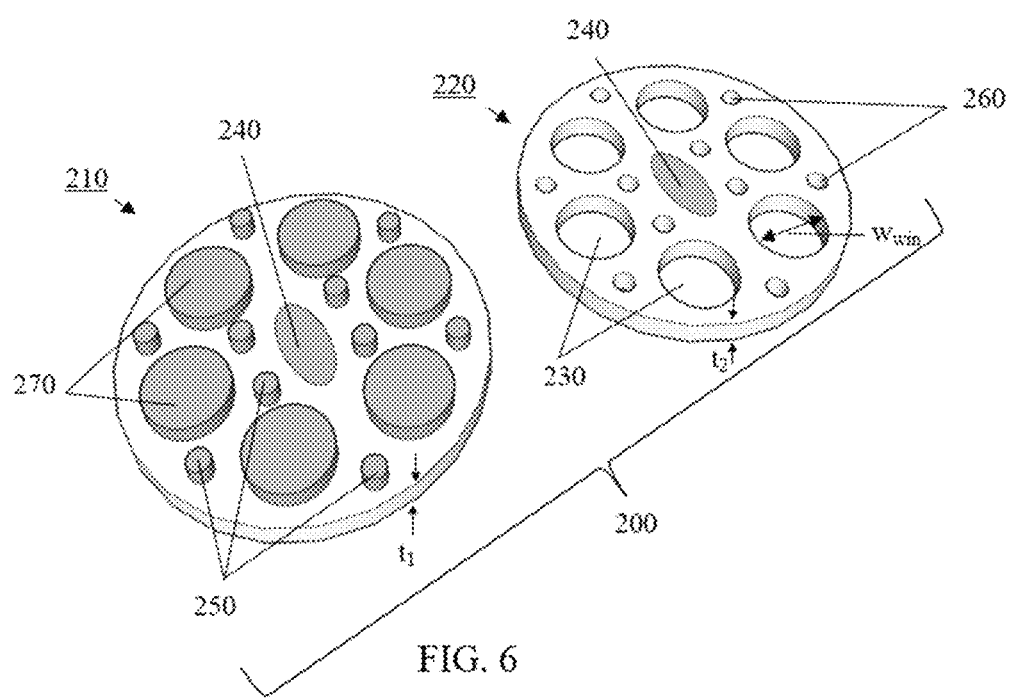
FIG. 6

| | | Parabens | | | | | | |
|---|---|---|---|---|---|---|---|---|
| | | \multicolumn{7}{c}{Enrichment factors (%)[a]} |
| | | MPB | EPB | PPB | iso-PPB | BPB | iso-BPB | BzPB |
| Biological matrices | Whole blood[b] | 178.10 | 274.55 | 613.93 | 753.25 | 1310.52 | 1612.25 | 1563.49 |
| *New Device* | Plasma[b] | 119.46 | 179.81 | 415.25 | 418.91 | 607.87 | 683.70 | 285.21 |
| | Urine | 307.09 | 561.21 | 846.93 | 925.54 | 1151.49 | 1227.12 | 910.84 |
| Environmental *New Device* | Tap water | 331.40 | 5889.58 | 930.51 | 1053.38 | 1668.29 | 1832.92 | 2056.03 |

[a] The enrichment factors were calculated as the percentage of peak area enhancement with respect to the area of reference standard solution.

[b] Whole blood and plasma samples were diluted 1:5 (v/v) before the extraction process. These samples were compared with a reference standard solution diluted 1:5 (v/v), too.

FIG. 14

| UV FILTERS | | | | | | | |
|---|---|---|---|---|---|---|---|
| | | BP-4 | 4-DHB | BP-2 | BP-1 | DHMB | BZ |
| | | Enrichment factors (%)[a] | | | | | |
| Biological matrices | New Device | | | | | | |
| | Whole blood[b] | 6.56 | 45.32 | 46.42 | 94.29 | 231.52 | 389.33 |
| | Plasma[b] | 8.28 | 13.71 | 15.28 | 15.51 | 88.71 | 311.71 |
| | Urine | 17.86 | 30.48 | 38.34 | 121.80 | 260.89 | 467.20 |
| Environmental | New Device | | | | | | |
| | Tap water | 23.49 | 112.03 | 130.16 | 297.26 | 544.84 | 577.22 |

[a] The enrichment factors were calculated as the percentage of peak area enhancement with respect to the area of reference standard solution. [b] Whole blood and plasma samples were diluted 1:5 (v:v) before the extraction process. These samples were compared with a reference standard solution diluted 1:5 (v:v), too.

FIG. 15

PHENOLIC COMPOUNDS

| | | Gallic acid | Vanillic acid | Caffeic acid | Syringic acid | (-)-epicatechin | p-coumaric acid | Resveratrol |
|---|---|---|---|---|---|---|---|---|
| | Whole blood[b] | - | - | - | - | - | 1.57 | 8.60 |
| Biological matrices | *New Device* Plasma[b] | 1.33 | 1.38 | 0.93 | - | 4.37 | 3.11 | 25.34 |
| | Urine | 4.86 | 8.06 | 10.29 | 7.97 | 19.07 | 12.40 | 71.20 |
| | Saliva | 5.80 | 8.73 | 9.82 | 7.04 | 24.19 | 11.36 | 69.47 |
| Environmental | *New Device* Tap water | 5.28 | 5.76 | 5.73 | 3.81 | 19.14 | 7.54 | 87.05 |

Enrichment factors (%)[a]

[a] The enrichment factors were calculated as the percentage of peak area enhancement with respect to the area of reference standard solution. [b] Whole blood and plasma samples were diluted 1:5 (v:v) before the extraction process. These samples were compared with a reference standard solution diluted 1:5 (v:v), too.

FIG. 16

| IBD Drugs | | | | |
|---|---|---|---|---|
| | | Ciprofloxacin | Sulfasalazine | Cortisone |
| | | Enrichment factors (%)[a] | | |
| Biological matrices | New Device | | | |
| | Whole blood[b] | 13.41 | 5.89 | 28.55 |
| | Plasma[b] | 14.06 | 8.57 | 42.55 |
| | Urine | 22.73 | 121.73 | 38.75 |
| Environmental | New Device | | | |
| | Tap water | 47.32 | 145.10 | 23.16 |

[a] The enrichment factors were calculated as the percentage of peak area enhancement with respect to the area of reference standard solution. [b] Whole blood and plasma samples were diluted 1:5 (v:v) before the extraction process. These samples were compared with a reference standard solution diluted 1:5 (v:v), too.

FIG. 17

| | | NSAIDs | | | | | | |
|---|---|---|---|---|---|---|---|---|
| | | Furprofen | Indoprofen | Ketoprofen | Fenbufen | Flurbiprofen | Ibuprofen |
| | | Enrichment factors (%)[a] | | | | | |
| Biological matrices | Whole blood[b] | 60.28 | 91.85 | 61.16 | 53.33 | 67.16 | - |
| | Plasma[b] | 66.07 | 87.68 | 82.43 | 69.15 | 95.36 | 46.44 |
| New Device | Urine | 8.97 | 15.01 | 20.25 | 51.35 | 80.77 | 105.32 |
| | Saliva[b] | 85.59 | 138.00 | 135.35 | 277.32 | 411.52 | 530.85 |
| | Saliva (unaltered) | 23.23 | 40.29 | 49.38 | 83.75 | 107.18 | 112.51 |
| Environmental New Device | Tap water | 10.12 | 14.04 | 17.87 | 39.77 | 55.48 | 73.17 |

[a] The enrichment factors were calculated as the percentage of peak area enhancement with respect to the area of reference standard solution. [b] Whole blood and plasma samples were diluted 1:5 (v:v) before the extraction. These samples were compared with a reference standard solution diluted 1:5 (v:v), too.

FIG. 18

DEVICES AND METHODS FOR EXTRACTION OF ANALYTES

BACKGROUND

A good analytical procedure often includes sample preparation, sampling, separation and analysis, quantification, and data analysis (e.g., statistical evaluation). Sample preparation aims to isolate target analytes from a matrix, in order to obtain a sample suitable for the instrumental analysis. This step is often crucial, as the analytes are usually present at very low concentrations (e.g., trace or ultra-trace levels). Moreover, the matrix to be treated may be complex and rich with interferents. The main analysis often concerns biological fluids, environmental samples, food samples, or the like. Thus, it is important that the sample preparation phase be done correctly, as the precision and trueness of the results will be affected by this step.

In recent years, many efforts have been made to simplify the sample preparation phase that is crucial and often performed carelessly. Different techniques that aim to isolate and concentrate target analytes before the analysis have been introduced. Often these techniques are multi-step and require time and consumption of solvent(s). Also, an important goal of modern technologies is not only to improve the quality of chemical analyses, but also to reduce the negative impact of chemical analyses on the environment, following the principles of Green Analytical Chemistry (GAC), which is about the role of analytical chemists in making laboratory practices more environmentally friendly. In addition to the development of instrumentation and methodologies necessary to improve the quality of chemical analyses, efforts are being made to reduce the negative impact of chemical analyses on the environment and to enable the implementation of sustainable development principles in analytical laboratories. An important challenge is to reach a compromise between increasing the quality of results and the improvement of environmental compatibility of analytical methods.

BRIEF SUMMARY

Embodiments of the subject invention provide novel and advantageous devices and methods for use in extraction procedures of analytes (organic and inorganic, including heavy metals) from matrices (e.g., complex matrices) in various fields (e.g., biological, clinical, chemical, environmental, toxicological, and forensic). The device can comprise a support structure made of, for example, an inert material, and acting as a rigid and stable support for extraction materials (e.g., membranes, electro-spun materials, membranes and materials obtained from adsorbent systems recovered from production and/or use waste, films, viscous gels, particles packed into hard disks, molecularly imprinted polymers (MIPs), paper, recycled planar adsorptive material, etc.) that can be inserted thereinto. The device can comprise a plurality of windows in the support structure through which the extraction materials can be exposed. The device can include two portions that can join together (e.g., using an interlocking system (such as a male-female interlocking system) that can include a plurality of protrusions on one of the portions and a corresponding plurality of holes, grooves, or trenches on the other portion).

In an embodiment, a device for extraction of one or more analytes from one or more matrices can comprise: a first portion comprising a plurality of protrusions and a first section of a compartment configured to contain a magnetic stirrer; and a second portion comprising a plurality of holes or grooves and a second section of the compartment configured to contain the magnetic stirrer. The plurality of protrusions can respectively correspond to the plurality of holes or grooves to form an interlocking system (e.g., a male-female interlocking system) to removably interlock the first portion and the second portion with each other to give a closed state of the device in which the compartment is complete. The device can comprise a plurality of windows configured to have a plurality of extractive materials respectively disposed therewithin when the device is in the closed state. The device can further comprise the plurality of extractive materials respectively disposed within the plurality of windows, and each extractive material of the plurality of extractive materials can be in a form of a planar membrane, an electro-spun material, a membrane or material obtained from adsorbent systems recovered from production and/or use waste, a film, a viscous gel, particles packed into a hard disk, an MIP, paper, or a recycled planar adsorptive material. The device can further comprise the magnetic stirrer disposed in the compartment. The first portion can comprise a first main body and the first section of the compartment connected to one end of the first body, the first main body having a rectangular shape with rounded corners, and the second portion can comprise a second main body and the second section of the compartment connected to one end of the second body, the second main body having a rectangular shape with rounded corners. The device can alternatively have a circular cross-section in the closed state. At least one of the first portion and the second portion can comprise a raised edge around each window of the plurality of windows, and/or at least one of the first portion and the second portion can comprise a depression, corresponding in size to the corresponding raised edge, around each window of the plurality of windows. The plurality of windows can comprise, for example, at least six windows. The plurality of protrusions can comprise, for example, at least eight protrusions. The plurality of holes or grooves can be holes and can comprise, for example, at least eight holes. A material of the first portion and a material of the second portion can both be inert with respect to the one or more analytes and the one or more matrices. A height of the device can be, for example, no more than 3.5 centimeters (cm) (e.g., the height can be 3.5 cm for a six-window configuration); a maximum width of the device can be, for example, no more than 3.5 cm (e.g., for a six-window configuration); a maximum thickness of the device can be, for example, no more than 1.1 cm (the maximum thickness can depend on, for example, a thickness of the magnetic stirrer); and a maximum width of each window of the plurality of windows can be, for example, no more than 0.7 cm (e.g., no more than 0.5 cm, and the extraction material can have a diameter of 0.6 cm). At these sizes, the device can be very small for convenience and low cost while still being large enough to easily see the results of the extraction process.

In another embodiment, a method of fabricating a device for extraction of one or more analytes from one or more matrices can comprise: creating a computer program with specifications of the device for the extraction of the one or more analytes from the one or more matrices; storing the computer program on a machine-readable medium; and printing, with a three-dimensional (3D) printer in operable communication with the machine-readable medium, the device using the computer program. The device can comprise: a first portion comprising a plurality of protrusions and a first section of a compartment configured to contain a magnetic stirrer; and a second portion comprising a plurality of holes or grooves and a second section of the compartment configured to contain the magnetic stirrer. The plurality of protrusions can respectively correspond to the plurality of holes or grooves to form an interlocking system (e.g.. a male-female interlocking system) to removably interlock the first portion and the second portion with each other to give a closed state of the device in which the compartment is complete. The device can comprise a plurality of windows configured to have a plurality of extractive materials respectively disposed therewithin when the device is in the closed state. The method can further comprise disposing the plurality of extractive materials within the plurality of windows, respectively. Each extractive material of the plurality of extractive materials can be in a form of a planar membrane, an electro-spun material, a membrane or material obtained from adsorbent systems recovered from production and/or use waste, a film, a viscous gel, particles packed into a hard disk, an MIP, paper, or a recycled planar adsorptive material. The method can further comprise disposing the magnetic stirrer in the compartment. The first portion can comprise a first main body and the first section of the compartment connected to one end of the first body, the first main body having a rectangular shape with rounded corners, and the second portion can comprise a second main body and the second section of the compartment connected to one end of the second body, the second main body having a rectangular shape with rounded corners. The device can alternatively have a circular cross-section in the closed state. At least one of the first portion and the second portion can comprise a raised edge around each window of the plurality of windows, and/or at least one of the first portion and the second portion can comprise a depression, corresponding in size to the corresponding raised edge, around each window of the plurality of windows. The plurality of windows can comprise, for example, at least six windows. The plurality of protrusions can comprise, for example, at least eight protrusions. The plurality of holes or grooves can be holes and can comprise, for example, at least eight holes. A material of the first portion and a material of the second portion can both be inert with respect to the one or more analytes and the one or more matrices. A height of the device can be, for example, no more than 3.5 centimeters (cm) (e.g., the height can be 3.5 cm for a six-window configuration); a maximum width of the device can be, for example, no more than 3.5 cm (e.g., for a six-window configuration); a maximum thickness of the device can be, for example, no more than 1.1 cm (the maximum thickness can depend on, for example, a thickness of the magnetic stirrer); and a maximum width of each window of the plurality of windows can be, for example, no more than 0.7 cm (e.g., no more than 0.5 cm, and the extraction material can have a diameter of 0.6 cm).

BRIEF DESCRIPTION OF DRAWINGS

FIG. 5A shows a side view of a device for use in extraction procedures of analytes, according to an embodiment of the subject invention. The device is fully closed.

FIG. 5B shows a top view of the device of FIG. 5A.

FIG. 5C shows a view of the device of FIG. 5A from the other side.

FIG. 5D shows a bottom view of the device of FIG. 5A.

FIG. 6 shows a perspective view of a device for use in extraction procedures of analytes, according to an embodiment of the subject invention.

FIG. 14 shows a table of enrichment factors calculated for selected parabens (PBs) in biological and environmental samples.

FIG. 15 shows a table of enrichment factors calculated for ultraviolet (UV) filters in biological and environmental samples.

FIG. 16 shows a table of enrichment factors calculated for phenolic compounds in biological and environmental samples.

FIG. 17 shows a table of enrichment factors calculated for drugs used to treat inflammatory bowel disease (IBD).

FIG. 18 shows a table of enrichment factors calculated for non-steroidal anti-inflammatory drugs (NSAIDs).

DETAILED DESCRIPTION

Embodiments of the subject invention provide novel and advantageous devices and methods for use in extraction procedures of analytes (organic and inorganic, including heavy metals) from matrices (e.g., complex matrices) in various fields (e.g., biological, clinical, chemical, environmental, toxicological, and forensic). The device can comprise a support structure made of, for example, an inert material, and acting as a rigid and stable support for extraction materials (e.g., membranes, electro-spun materials, membranes and materials obtained from adsorbent systems recovered from production and/or use waste, films, viscous gels, particles packed into hard disks, molecularly imprinted polymers (MIPs), paper, recycled planar adsorptive material, etc.) that can be inserted thereinto. The device can comprise a plurality of windows in the support structure through which the extraction materials can be exposed. The device can include two portions that can join together (e.g., using a male-female interlocking system that can include a plurality of protrusions on one of the portions and a corresponding plurality of holes, grooves, or trenches on the other portion).

In view of Green Analytical Chemistry (GAC), different micro extraction procedures have been developed, such as fabric phase sorptive extraction (FPSE) (see also U.S. Pat. No. 9,557,252 and U.S. Pat. No. 10,352,833, both of which are incorporated by reference herein in their entireties). FPSE is a sorbent extraction technique that uses a solid material for retaining specific compounds from a sample matrix. FPSE combines in a single device the exhaustive extraction mode of solid-phase extraction (SPE) and equilibrium extraction mode of solid-phase micro-extraction. One of the main advantages of this technique is the high primary contact surface area (PCSA) of the extraction medium. PCSA is the extraction device surface area, which can be directly accessed from the sample matrix.

Figures 1A, 1B, 1C:
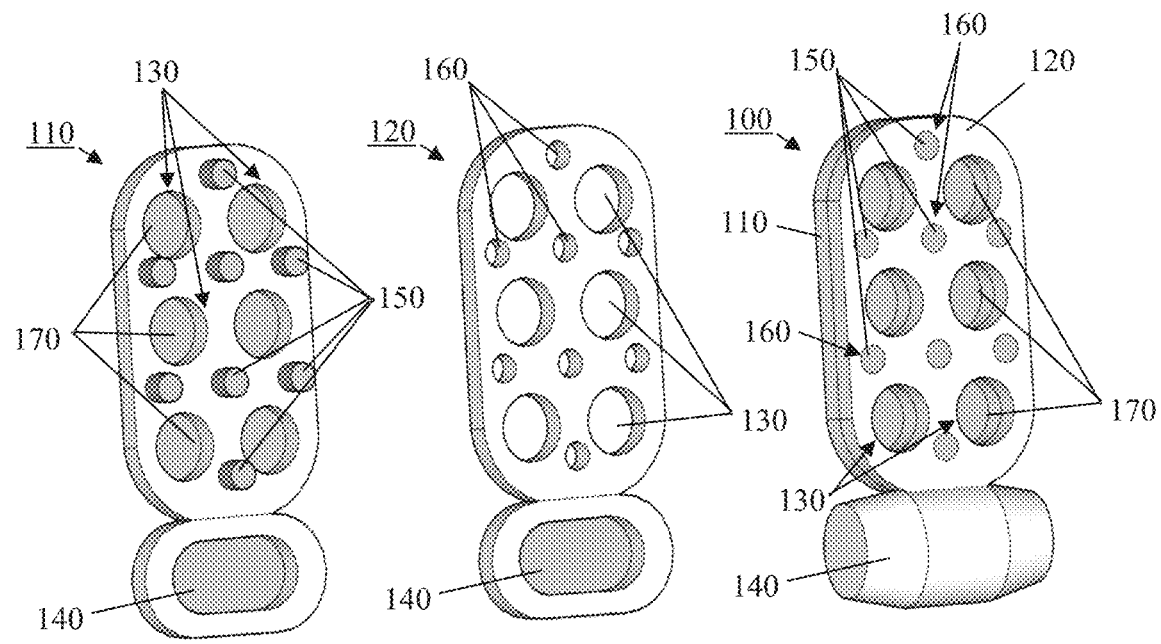
FIG. 1A shows a perspective view of a first portion of a device for use in extraction procedures of analytes, according to an embodiment of the subject invention.
FIG. 1B shows a perspective view of a second portion of a device for use in extraction procedures of analytes, according to an embodiment of the subject invention.
FIG. 1C shows a perspective view of a device for use in extraction procedures of analytes, according to an embodiment of the subject invention, with the first and second portions from FIGS. 1A and 1B combined.
Figures 2A, 2B, 2C:
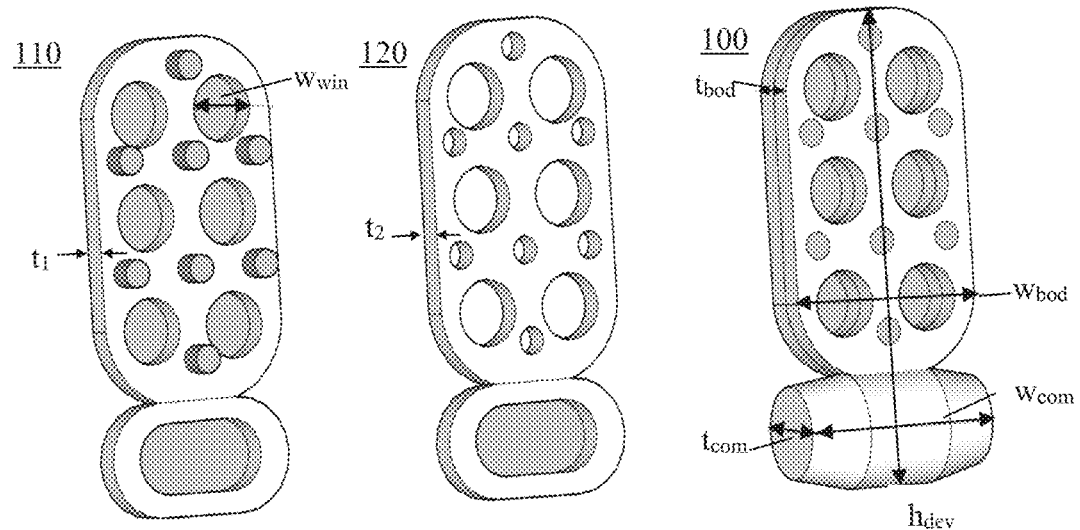
FIG. 2A shows a perspective view of a first portion of a device for use in extraction procedures of analytes, according to an embodiment of the subject invention.
FIG. 2B shows a perspective view of a second portion of a device for use in extraction procedures of analytes, according to an embodiment of the subject invention.
FIG. 2C shows a perspective view of a device for use in extraction procedures of analytes, according to an embodiment of the subject invention, with the first and second portions from FIGS. 2A and 2B combined.

FIGS. 1A and 2A show perspective views of a first portion of a device for use in extraction procedures of analytes, according to an embodiment of the subject invention; FIGS. 1B and 2B show perspective views of a second portion of the device; and FIGS. 1C and 2C show perspective views of the device with the first and second portions combined. Referring to FIGS. 1A-2C, the device 100 can include the first portion 110 and the second potion 120, which can be connected to each other, removably and/or irremovably. The first portion 110 and the second portion 120 can be connected to each other via, for example, a connection hinge 180 (see FIG. 4B) or other connection that is irremovably coupled to both the first portion 110 and the second portion 120. The first portion 110 and the second portion 120 can also be removably connected to each other via, for example, an interlocking system (e.g., a male-female interlocking system) that can include protrusions 150 on one of the portions (e.g., the first portion 110) and an interlocking portion 160 (e.g., holes, grooves, or trenches) on the other portion (e.g., the second portion 120).

The first 110 and/or second 120 portions can include windows 130 that can expose extraction materials 170 therethrough when the device 100 is closed (i.e., when the first 110 and second 120 portions are fully interlocked with each other via the interlocking system). The second portion 120 can have windows 130 that are holes completely through the second portion 120 in a thickness direction of the second portion 120 (see $t_2$ in FIG. 2B). The windows 130 of the first portion 110 can either go completely through the first portion 110 in a thickness direction thereof (see $t_1$ in FIG. 2A) or can be groove- or trench-like depressions. In either case, the extraction materials 170 for use in extraction procedures of analytes (organic and inorganic, including heavy metals) from matrices (e.g., complex matrices) can be disposed within the windows 130 (e.g., within the windows 130 of one of the portions 110,120 or between the first 110 and second 120 portions). Any or all of the windows 130 can have an extraction material 170 disposed therewithin, and the extraction materials 170 of the device 100 can either be all the same, all different from each other, or some can be the same while some are different, depending on the desired application of the device 100.

The device 100 can also include a compartment 140 at one end thereof, which can function as, for example, a container (partial or full) or housing for a magnetic stirrer or stir bar. The compartment 140 can have a first cross-section (taken in a plane parallel to the height direction (see $h_{dev}$ in FIG. 2C) and the width direction (see $w_{bod}$ in FIG. 2C) of the device 100) that is polygonal or that has rounded edges (e.g., rectangular or oval, though embodiments are not limited thereto). The compartment 140 can have a second cross-section (taken in a plane parallel to the thickness direction (see $t_{bod}$ in FIG. 2C) of the device 100) that is polygonal or that has rounded edges (e.g., rectangular, square, oval, or circular, though embodiments are not limited thereto). For example, the first cross-section can have an oval shape, and the second cross-section can have a circular shape, as seen in FIGS. 3-5D. Optionally, the compartment can also be used to connect the first 110 and second 120 portions to each other (either instead of, or in addition to, a connection hinge 180). Each window 130 can have a cross-section (taken in a plane parallel to the height direction (see $h_{dev}$ in FIG. 2C) and the width direction (see $w_{bod}$ in FIG. 2C) of the device 100) that is circular, though embodiments are not limited thereto.

Figure 3:
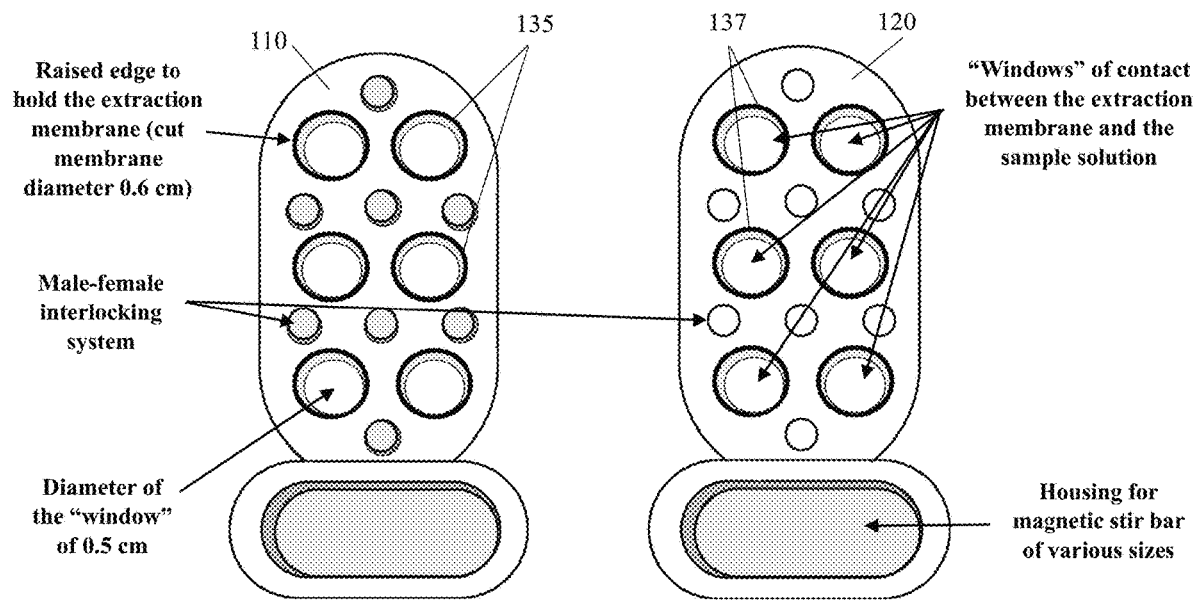
FIG. 3 shows a top view of first and second portions of a device for use in extraction procedures of analytes, according to an embodiment of the subject invention.
Figures 4A, 4B, 4C:
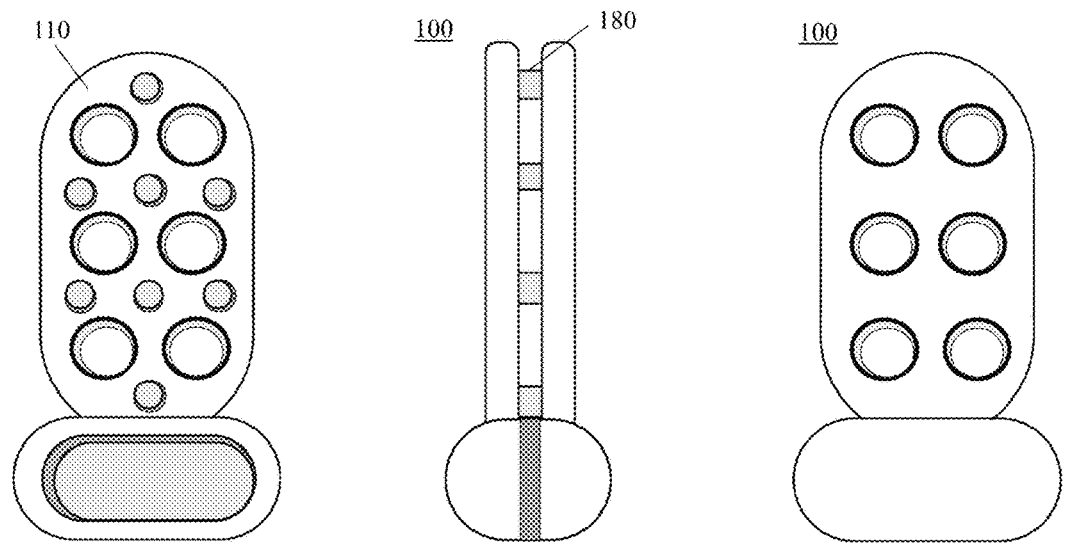
FIG. 4A shows a top view of a first portion of a device for use in extraction procedures of analytes, according to an embodiment of the subject invention.
FIG. 4B shows a side view of a device for use in extraction procedures of analytes, according to an embodiment of the subject invention. The device is not fully closed. A connection hinge can be seen at an upper portion of the figure, connecting the first and second portions of the device.
FIG. 4C shows a bottom view of the device of FIG. 4B.

FIG. 3 shows a top view of the first 110 and second 120 portions of a device 100, according to an embodiment of the subject invention; FIG. 4A shows a top view of the first portion 110 of the device 100; FIG. 4B shows a side view of the device 100 in a partially closed state; FIG. 4C shows a bottom view of the device 100; FIG. 5A shows a view of a first side of the device 100 in a fully closed state; FIG. 5B shows a top view of the device 100; FIG. 5C shows a view of a second side of the device 100 opposite from the first side; and FIG. 5D shows a bottom view of the device 100. Though FIGS. 3 and 5A-5D list sizes for certain portions of the device 100, these are for exemplary purposes only and should not be construed as limiting. Referring to FIG. 3, the first 110 or second 120 portion can have a raised edge 135 around each window 130 to help hold the extraction materials 170 in place in use. The other portion can have depressions 137 around each window 130 respectively corresponding to the raised edges 135.

A maximum width ($w_{win}$) of each window 130 (which can be a diameter of the window if the windows have a circular cross-section) can be any of the following values, about any of the following values, at least any of the following values, at most any of the following values, or within any range having any of the following values as endpoints (all values are in centimeters (cm)): 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, or higher if sample volume will allow the use of such a large device. For example, the maximum width ($w_{win}$) of each window 130 can be in a range of from 0.3 cm to 0.7 cm (e.g., 0.5 cm or about 0.5 cm). A maximum width of each extraction material 170 disposed within the windows 130 can be any of the following values, about any of the following values, at least any of the following values, at most any of the following values, or within any range having any of the following values as endpoints (all values are in centimeters (cm)): 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, or higher if sample volume will allow the use of such a large device. For example, the maximum width of each extraction material 170 disposed within the windows 130 can be in a range of from 0.3 cm to 0.8 cm (e.g., 0.6 cm or about 0.6 cm).

A width ($w_{bod}$) of the main body of the device 100 can be any of the following values, about any of the following values, at least any of the following values, at most any of the following values, or within any range having any of the following values as endpoints (all values are in cm): 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 25 4.8, 4.9, 5, or higher depending on the magnetic stirrer or stir bar size. For example, the width ($w_{bod}$) of the main body of the device 100 can be in a range of from 1.3 cm to 1.7 cm (e.g., 1.5 cm or about 1.5 cm). A width ($w_{com}$) of the compartment 140 can be any of the following values, about any of the following values, at least any of the following values, at most any of the following values, or within any range having any of the following values as endpoints (all values are in cm): 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5, or higher depending on the magnetic stirrer or stir bar size. For example, the width ($w_{com}$) of the compartment 140 can be in a range of from 1.6 cm to 2.0 cm (e.g., 1.8 cm or about 1.8 cm). A height ($h_{dev}$) of the device 100 can be any of the following values, about any of the following values, at least any of the following values, at most any of the following values, or within any range having any of the following values as endpoints (all values are in cm): 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5, 5.5, 6, 6.5, 7, 7.5, 8, 8.5, 9, 9.5, 10, or higher if sample volume will allow the use of such a large device. For example, the height ($h_{dev}$) of the device 100 can be in a range of from 3.0 cm to 3.8 cm (e.g., 3.4 cm or about 3.4 cm).

A thickness ($t_1$, $t_2$) of each of the first 110 and second 120 portions of the device 100 can be any of the following values, about any of the following values, at least any of the following values, at most any of the following values, or within any range having any of the following values as endpoints (all values are in cm): 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, or 2. For example, the thickness ($t_1$, $t_2$) of each of the first 110 and second 120 portions of the device 100 can be in a range of from 0.1 cm to 0.3 cm (e.g., 0.2 cm or about 0.2 cm). A thickness ($t_{bod}$) of the main body of the device 100 can be any of the following values, about any of the following values, at least any of the following values, at most any of the following values, or within any range having any of the following values as endpoints (all values are in cm): 0.02, 0.03, 0.04, 0.05, 0.06, 0.07, 0.08, 0.09, 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, or 4. For example, the thickness ($t_{bod}$) of the main body of the device 100 can be in a range of from 0.2 cm to 0.6 cm (e.g., 0.4 cm or about 0.4 cm). A thickness ($t_{com}$) of the compartment 140 can be any of the following values, about any of the following values, at least any of the following values, at most any of the following values, or within any range having any of the following values as endpoints (all values are in cm): 0.05, 0.06, 0.07, 0.08, 0.09, 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5, or higher depending on the magnetic stirrer or stir bar size. For example, the thickness ($t_{com}$) of the compartment 140 can be in a range of from 0.8 cm to 1.2 cm (e.g., 1.0 cm or about 1.0 cm).

Figure 7:
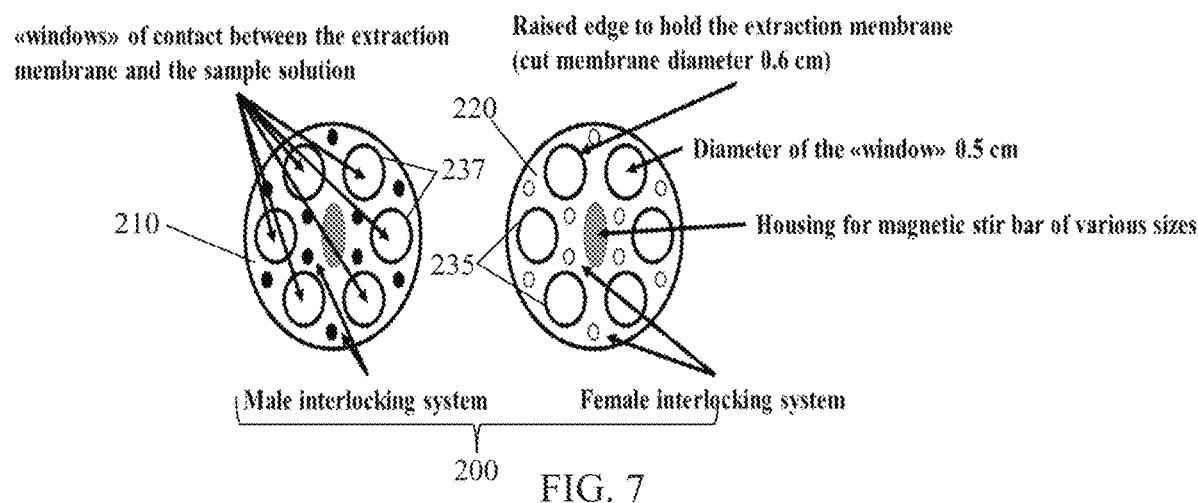
FIG. 7 shows a top view of a device for use in extraction procedures of analytes, according to an embodiment of the subject invention.
Figure 8:
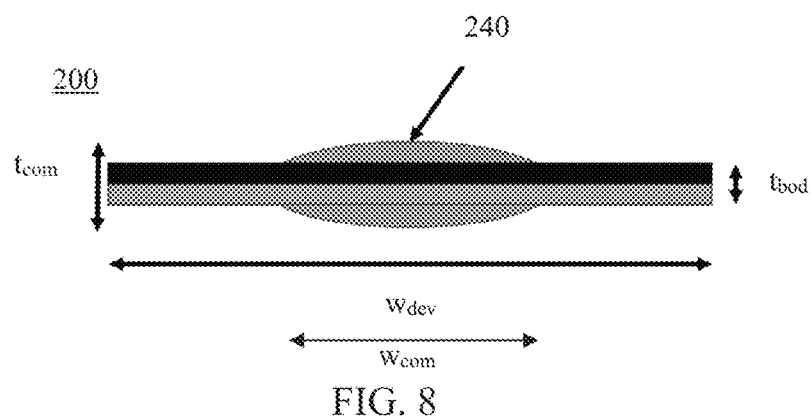
FIG. 8 shows a side view of a device for use in extraction procedures of analytes, according to an embodiment of the subject invention.

FIG. 6 shows a perspective view of a device for use in extraction procedures of analytes, according to an embodiment of the subject invention; FIG. 7 shows a top view of the device; and FIG. 8 shows a side view of the device. Though FIG. 7 lists sizes for certain portions of the device, these are for exemplary purposes only and should not be construed as limiting. Referring to FIGS. 6-8, a device 200 can have an oval (or generally oval) or circular (or generally circular) shape. The device 200 can include a first portion 210 and a second potion 220, which can be connected to each other, removably and/or irremovably. The first portion 210 and the second portion 220 can be connected to each other via, for example, a connection hinge (similar to that shown in FIG. 4B) or other connection that is irremovably coupled to both the first portion 210 and the second portion 220. The first portion 210 and the second portion 220 can also be removably connected to each other via, for example, an interlocking system (e.g., a male-female interlocking system) that can include protrusions 250 on one of the portions (e.g., the first portion 210) and an interlocking portion 260 (e.g., holes, grooves, or trenches) on the other portion (e.g., the second portion 220).

The first 210 and/or second 220 portions can include windows 230 that can expose extraction materials 270 therethrough when the device 200 is closed (i.e., when the first 210 and second 220 portions are fully interlocked with each other via the interlocking system). The second portion 220 can have windows 230 that are holes completely through the second portion 220 in a thickness direction of the second portion 220 (i.e., into the page in FIG. 7). The windows 230 of the first portion 210 can either go completely through the first portion 210 in a thickness direction thereof (i.e., into the page in FIG. 7) or can be groove- or trench-like depressions. In either case, the extraction materials 270 for use in extraction procedures of analytes (organic and inorganic, including heavy metals) from matrices (e.g., complex matrices) can be disposed within the windows 230 (e.g., within the windows 230 of one of the portions 210,220 or between the first 210 and second 220 portions). Any or all of the windows 230 can have an extraction material 270 disposed therewithin, and the extraction materials 270 of the device 200 can either be all the same, all different from each other, or some can be the same while some are different, depending on the desired application of the device 200.

The device 200 can also include a compartment 240 at a center thereof, which can function as, for example, a housing for a magnetic stirrer or stir bar. The compartment 240 can have a first cross-section (taken in a plane perpendicular to the thickness direction of the device 200) that is polygonal or that has rounded edges (e.g., rectangular or oval, though embodiments are not limited thereto). The compartment 240 can have a second cross-section (taken in a plane parallel to the thickness direction of the device 200 and perpendicular to the plane in which the first cross-section is taken) that is polygonal or that has rounded edges (e.g., rectangular, square, oval, or circular, though embodiments are not limited thereto). For example, the first cross-section can have an oval shape, and the second cross-section can have an oval shape, as seen in FIGS. 6-8. Optionally, the compartment can also be used to connect the first 210 and second 220 portions to each other (either instead of, or in addition to, a connection hinge). Each window 230 can have a cross-section (taken in a plane perpendicular to the thickness direction of the device 100) that is circular, though embodiments are not limited thereto. The first 210 or second 220 portion can have a raised edge 235 around each window 230 to help hold the extraction materials 270 in place in use. The other portion can have depressions 237 around each window 230 respectively corresponding to the raised edges 235.

A maximum width ($w_{dev}$) of the device 200 (which can be a diameter of the device if it is circular) can be any of the following values, about any of the following values, at least any of the following values, at most any of the following values, or within any range having any of the following values as endpoints (all values are in cm): 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5, or higher if sample volume will allow the use of such a large device. For example, the maximum width ($W_{dev}$) of the device 200 can be in a range of from 1.3 cm to 4.3 cm (e.g., 2.0 cm to 4.0 cm, such as 1.5 cm or about 1.5 cm, or 3.4 cm or about 3.4 cm). A maximum width ($w_{com}$) of the compartment 240 can be any of the following values, about any of the following values, at least any of the following values, at most any of the following values, or within any range having any of the following values as endpoints (all values are in cm):0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, or higher depending on the magnetic stirrer or stir bar size. For example, the maximum width ($w_{com}$) of the compartment 240 can be in a range of from 1.0 cm to 2.6 cm (e.g., 1.8 cm or about 1.8 cm).

A thickness ($t_1$, $t_2$) of each of the first 210 and second 220 portions of the device 200 can be any of the following values, about any of the following values, at least any of the following values, at most any of the following values, or within any range having any of the following values as endpoints (all values are in cm): 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, or 2. For example, the thickness ($t_1$, $t_2$) of each of the first 210 and second 220 portions of the device 200 can be in a range of from 0.1 cm to 0.3 cm (e.g., 0.2 cm or about 0.2 cm). A thickness ($t_{bod}$) of the main body of the device 200 can be any of the following values, about any of the following values, at least any of the following values, at most any of the following values, or within any range having any of the following values as endpoints (all values are in cm): 0.02, 0.03, 0.04, 0.05, 0.06, 0.07, 0.08, 0.09, 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, or 4. For example, the thickness ($t_{bod}$) of the main body of the device 200 can be in a range of from 0.2 cm to 0.6 cm (e.g., 0.4 cm or about 0.4 cm). A thickness ($t_{com}$) of the compartment 240 can be any of the following values, about any of the following values, at least any of the following values, at most any of the following values, or within any range having any of the following values as endpoints (all values are in cm): 0.05, 0.06, 0.07, 0.08, 0.09, 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5, or higher depending on the magnetic stirrer or stir bar size. For example, the thickness ($t_{com}$) of the compartment 240 can be in a range of from 0.8 cm to 1.2 cm (e.g., 1.0 cm or about 1.0 cm).

A maximum width ($w_{win}$) of each window 230 (which can be a diameter of the window if the windows have a circular cross-section) can be any of the following values, about any of the following values, at least any of the following values, at most any of the following values, or within any range having any of the following values as endpoints (all values are in cm): 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, or higher if sample volume will allow the use of such a large device. For example, the maximum width ($w_{win}$) of each window 230 can be in a range of from 0.3 cm to 0.7 cm (e.g., 0.5 cm or about 0.5 cm). A maximum width of each extraction material 270 disposed within the windows 230 can be any of the following values, about any of the following values, at least any of the following values, at most any of the following values, or within any range having any of the following values as endpoints (all values are in cm): 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, or higher if sample volume will allow the use of such a large device. For example, the maximum width of each extraction material 270 disposed within the windows 230 can be in a range of from 0.3 cm to 0.8 cm (e.g., 0.6 cm or about 0.6 cm).

The device 100,200 can include any suitable number of windows 130,230 depending on the desired extraction process in which the device will be used. For example, the number of windows can be related to the sample volume available (e.g., low volumes are generally available for biological fluids and a smaller device may be used, whereas for environmental often high volumes are often used and a larger device may be used). The depiction of six windows in the figures is for exemplary purposes only and should not be construed as limiting. In the device, the inclusion of the compartment 140,240 allows for use of a magnetic stirrer as an anchor. The configuration of the device, including the compartment 140,240, the windows 130,230, and the interlocking system allows for fixing and locking the anchor and the extractive material(s), thereby allowing for use of the device in different matrices due to its stability throughout the extraction process.

In many embodiments, the material of the first and second portions of the device can be an inert material (i.e., inert with respect to the analytes and matrices with which the device is configured for (or adapted to) use). The inert material can be, for example, a resin (e.g., a polymeric resin), recycled plastic, or other filaments of waste material of different processes (thereby reusing waste from other processes). The extraction materials can be, for example, membranes, electro-spun materials, membranes and materials obtained from adsorbent systems recovered from production and/or use waste, films, viscous gels, particles packed into hard disks, MIPs, paper, and/or recycled planar adsorptive material. The device also provides for the housing of a magnetic stirrer of various sizes in order to facilitate and increase the recovery process while keeping the sample solution stirred during use. In fact, based on the following equation, $$t_{e,95\%} = \frac{B\delta b K_{es}}{D_s} \qquad (1)$$

it can be observed that the time required to extract 95% of the equilibrium extraction amount of the analytes ($t_{e,95\%}$) is inversely proportional to the analyte diffusion coefficient in the matrix ($D_s$) and directly proportional to the geometric factor that refers to the geometry on which the extraction sorbent is coated (B), a thickness of the boundary layer (δ), a thickness of the extraction sorbent coating (b), and the distribution constant of analyte between the extraction sorbent and the sample matrix ($K_{es}$). Thus, by enhancing the analyte diffusion in the matrix it is possible to achieve a lower extraction time. The device, can include a compartment or pocket where the magnetic anchor (i.e., magnetic stirrer) can be housed, allowing an increase in the diffusivity of the analytes inside the sample during extraction, even when the matrix is more viscous (e.g., whole blood). This configuration also allows use this device for in-field and in situ sampling by means of a portable magnetic stirrer and/or orbital shaker.

Embodiments of the device allows effective application of various permeable extraction materials available on the market (or self-synthetized in a laboratory) in the extraction processes. The device can include a fabric phase sorbent media (FPSM) array with different surface chemistry and selectivities to maximize a panel of compounds that can be recovered, and can also be used as a suitable support for all other permeable planar extraction material used in these analytical procedures (see also Analytical Chemistry, 2021, 93(4), 1957-1961; which is hereby incorporated by reference herein in its entirety).

In an embodiment, a method of fabricating a device for use in extraction procedures of analytes (organic and inorganic, including heavy metals) from matrices (e.g., complex matrices) in various fields (e.g., biological, clinical, chemical, environmental, toxicological, and forensic) can include using a three-dimensional (3D) printer (e.g., a resin 3D printer and/or a digital light processing (DLP) 3D printer) to print the first and second portions of the device according to the desired specifications for an extraction procedure. The extraction material(s) can be then be disposed within the window(s) of the device. The method can include the use of programming software for the 3D printer to be used to replicate the device.

In an embodiment, a method of performing an extraction procedure of one or more analytes (organic and inorganic, including heavy metals) from one or more matrices (e.g., complex matrices) (e.g., biological, clinical, chemical, environmental, toxicological, and forensic matrices) can include providing (or fabricating) a device as disclosed herein and using the device in a sample (that is to be tested for the one or more analytes of interest) having at least one of the one or more matrices. The extraction materials can test for the one or more analytes.

Embodiments of the subject invention provide in-field sampling devices and methods for the recovery of organic and inorganic analytes from complex matrices with biological, clinical, chemical, pharmaceutical, environmental, toxicological, and forensic significance for immediate instrumental analysis, while also providing easy storage of the device under a controlled environment with proper chain of custody (as applicable in the forensic field; e.g., as valid alternative evidence in case of any future judicial challenge that requires a re-analysis in order to validate a first report).

The device can have any suitable shape or configuration, and the generally circular or oval (e.g., FIGS. 6-8) and generally rectangular with rounded corners (e.g., FIGS. 1A-5D) shapes are for exemplary purposes only and should not be construed as limiting.

Embodiments of the subject invention allow for in-field and in situ analysis in which, using a portable magnetic stirrer (which can be powered by a battery and operated remotely), it is possible to process (selectively and quantitatively extract the analytes of interest) samples directly in the field. This is advantageous particularly when it is not possible to perform analyses simultaneously with the extraction, so the device can be used for extraction and then transported to a laboratory for actual analysis. In this way, transporting samples that would require particular storage conditions can be avoided, making the analysis cheaper. Further, the device is reusable because the structure (e.g., resin structure) is resistant and does not involve memory effect problems between one analysis and the next after washing the device. The number of times the device can be reused is limited only by the care taken by the user in opening and closing the first and second portions of the device.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that are capable of storing computer-readable information/data. Computer-readable media and machine-readable media should not be construed or interpreted to include any propagating signals. A computer-readable medium of embodiments of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

The transitional term "comprising," "comprises," or "comprise" is inclusive or open-ended and does not exclude additional, unrecited elements or method steps. By contrast, the transitional phrase "consisting of" excludes any element, step, or ingredient not specified in the claim. The phrases "consisting" or "consists essentially of" indicate that the claim encompasses embodiments containing the specified materials or steps and those that do not materially affect the basic and novel characteristic(s) of the claim. Use of the term "comprising" contemplates other embodiments that "consist" or "consisting essentially of" the recited component(s).

When ranges are used herein, such as for dose ranges, combinations and subcombinations of ranges (e.g., sub-ranges within the disclosed range), specific embodiments therein are intended to be explicitly included. When the term "about" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to embodiments of the invention.

Materials and Methods

The device as shown in FIGS. 3-5D was tested on the extraction of different selected compounds. The sample preparation phase represents a key step when complex matrices are treated, so the device was first tested in biological fluids (whole blood, plasma, urine, and saliva) and then in tap water, in order to demonstrate the wide applicability also in environmental samples. Before conducting each experiment, the device was first activated/cleaned using a methanol:acetonitrile (MeOH:AcN) solution (50:50, volume:volume (v:v)) and then rinsed in Milli-Q water. All the instrumental analyses, by means of validated methods (see also J. Chromatogr. B 1125 (2019) 1-10; J. Pharm. Biomed. 209 (2021) 1-6; J. Chromatogr. B 1144 (2020) 1-9; J. Chromatogr. B, 1118-1119 (2019) 40-50; and J. Chromatogr. B 1084 (2018) 53-63; all five of which are hereby incorporated herein by reference in their entireties), were performed to compare the results obtained by applying the device with reference standard solutions and evaluate the enrichment factors (%).

EXAMPLE 1

Figure 9:
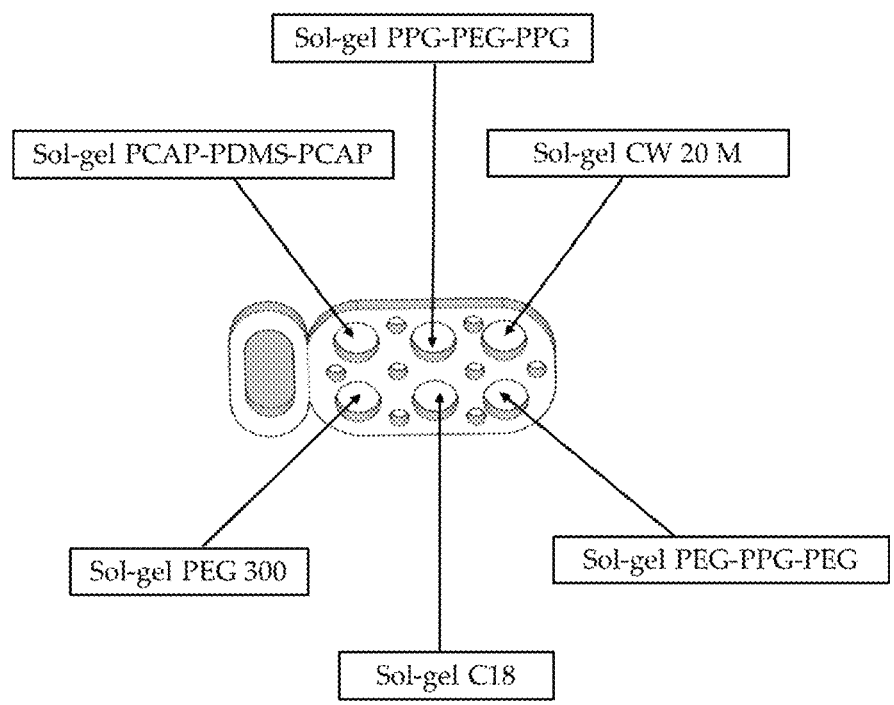
FIG. 9 shows a perspective view of a device for use in extraction procedures of analytes, according to an embodiment of the subject invention.

An analysis of seven selected parabens (PBs) was conducted both in biological fluids and tap water, including methyl paraben (MPB), ethyl paraben (EPB), propyl paraben (PPB), isopropyl paraben (iPPB), butyl paraben (BPB), isobutyl paraben (iBPB) and benzyl paraben (BzPB). As shown in FIG. 9, the selected sorbents (extractive material membranes) for the device were sol-gel Carbowax® 20 M (sol-gel CW 20M), sol-gel polycaprolactone-polydimethylsiloxane-polycaprolactone (sol-gel PCAP-PDMS-PCAP), sol-gel polyethylene glycol-block-polypropylene glycol-block-polyethylene glycol (sol-gel PEG-PPG-PEG), sol-gel polypropylene glycol-block-polyethylene glycol-block-polypropylene glycol (sol-gel PPG-PEG-PPG), sol-gel polyethylene glycol 300 (sol-gel PEG 300), and sol-gel octadecyl (sol-gel C18). After the cleaning, the membranes were disposed inside the windows as shown in FIG. 9. The analysis was performed in biological fluids as well as in tap water, as representative of an environmental sample. The extraction was carried out in three different biological fluids (whole blood, plasma, and urine) for 60 minutes each. After extraction process, the devices were removed from the respective samples (by using tweezers to avoid contamination) and were all inserted in 150 μL of MeOH for the elution of target analytes. The sample was then centrifuged and the supernatant was analyzed in a high-performance liquid chromatography (HPLC) system using a previously validated analytical method (see also the validated methods referred to in the Materials and Methods section). The obtained data were compared with a reference standard solution and the enrichment factors (%) are reported in the table in FIG. 14 (results for the tested device are listed as "New Device" in FIG. 14). Referring to FIG. 14, the tested device showed excellent performance in both biological and environmental samples, leading to high enrichment factors for all tested parabens.

EXAMPLE 2

Figure 10:
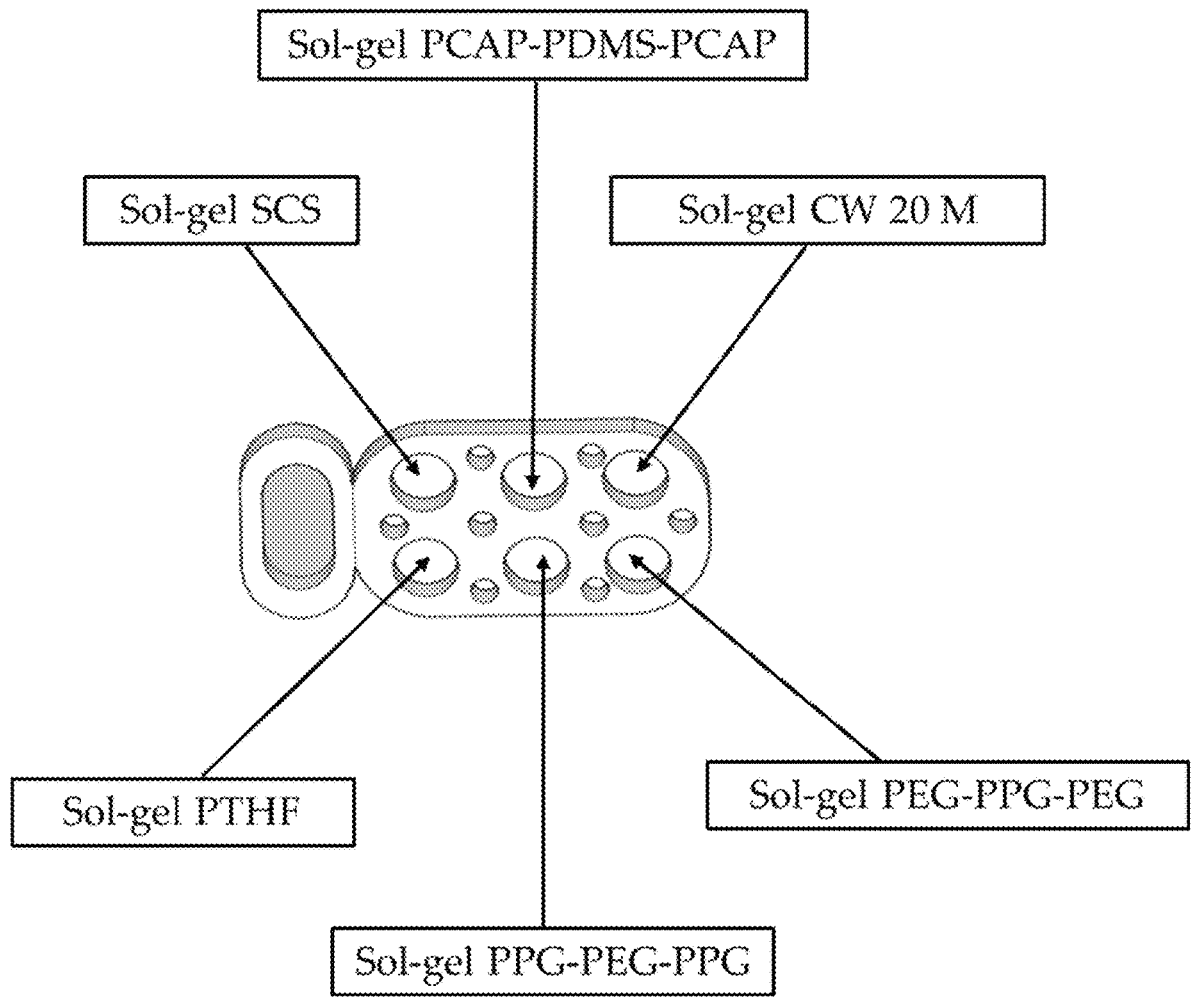
FIG. 10 shows a perspective view of a device for use in extraction procedures of analytes, according to an embodiment of the subject invention.

The experiment of Example 1 was repeated for ultraviolet (UV filters), with extractive material membranes as shown in FIG. 10. The analysis was performed in biological fluids (whole blood, plasma, and urine) as well as in tap water, as representative of an environmental sample. The obtained data were compared with a reference standard solution and the enrichment factors (%) are reported in the table in FIG. 15 (results for the tested device are listed as "New Device" in FIG. 15). Referring to FIG. 15, the tested device showed good performance in both biological and environmental samples, leading to high enrichment factors for all tested UV filters.

EXAMPLE 3

Figure 11:
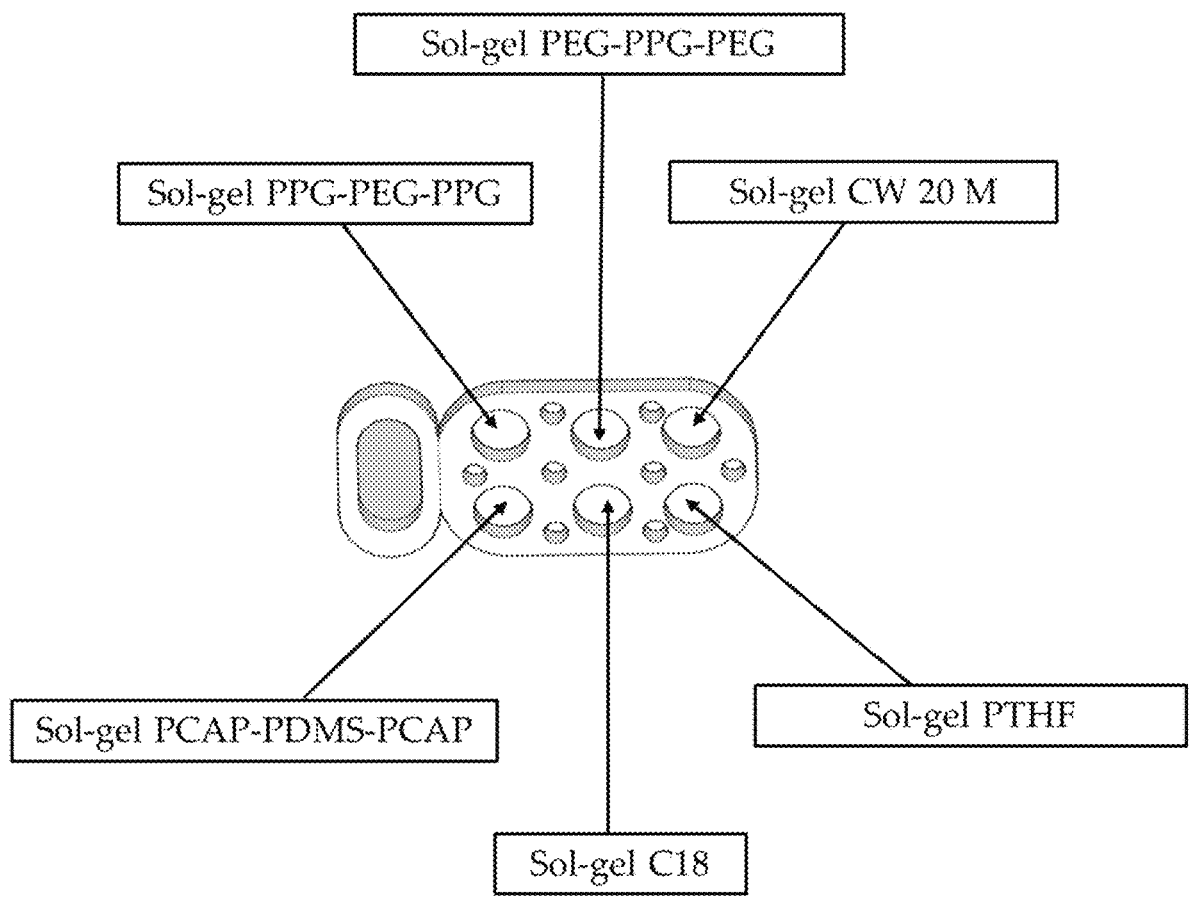
FIG. 11 shows a perspective view of a device for use in extraction procedures of analytes, according to an embodiment of the subject invention.

The experiment of Example 1 was repeated for phenolic compounds, with extractive material membranes as shown in FIG. 11. The analysis was performed in biological fluids (whole blood, plasma, urine, and saliva) as well as in tap water, as representative of an environmental sample. The obtained data were compared with a reference standard solution and the enrichment factors (%) are reported in the table in FIG. 16 (results for the tested device are listed as "New Device" in FIG. 16). Referring to FIG. 16, the tested device showed good performance in both biological and environmental samples, leading to high enrichment factors for all tested phenolic compounds.

EXAMPLE 4

Figure 12:
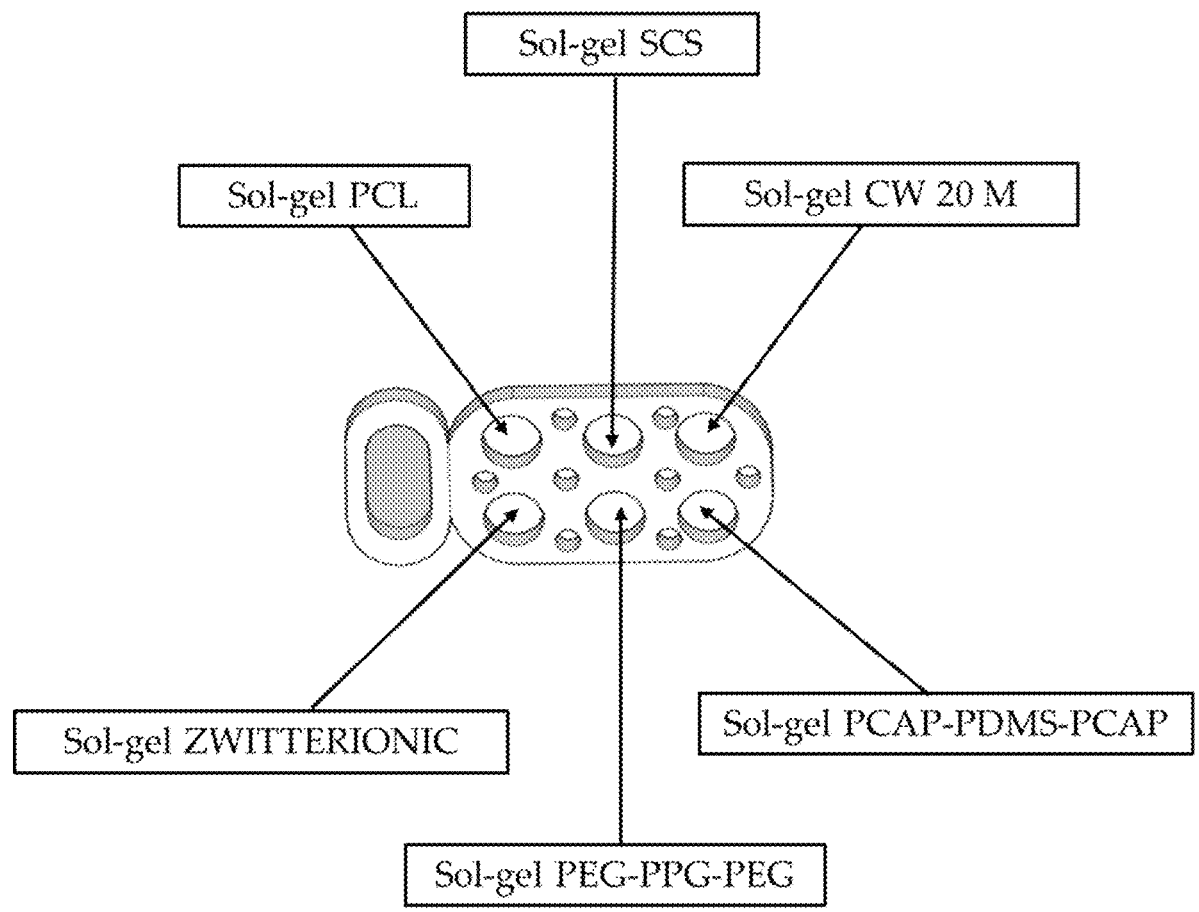
FIG. 12 shows a perspective view of a device for use in extraction procedures of analytes, according to an embodiment of the subject invention.

The experiment of Example 1 was repeated for drugs used in the treatment of inflammatory bowel disease (IBD), with extractive material membranes as shown in FIG. 12. The analysis was performed in biological fluids (whole blood, plasma, and urine) as well as in tap water, as representative of an environmental sample. The obtained data were compared with a reference standard solution and the enrichment factors (%) are reported in the table in FIG. 17 (results for the tested device are listed as "New Device" in FIG. 17). Referring to FIG. 17, the tested device showed good performance in both biological and environmental samples, leading to high enrichment factors for all tested drugs used in the treatment of IBD.

EXAMPLE 5

Figure 13:
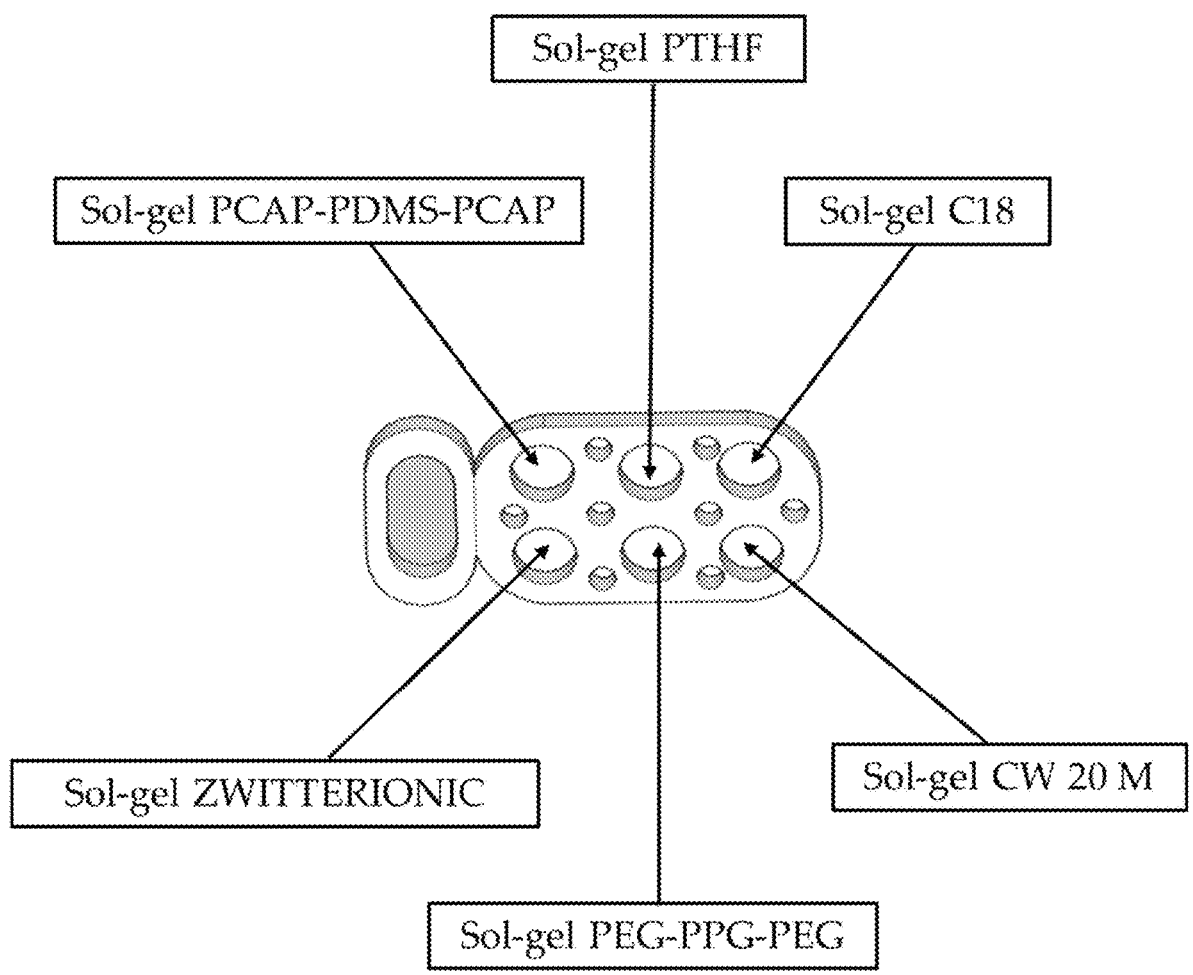
FIG. 13 shows a perspective view of a device for use in extraction procedures of analytes, according to an embodiment of the subject invention.

The experiment of Example 1 was repeated for non-steroidal anti-inflammatory drugs (NSAIDs), with extractive material membranes as shown in FIG. 13. The analysis was performed in biological fluids (whole blood, plasma, urine, saliva (diluted), and saliva (unaltered)) as well as in tap water, as representative of an environmental sample. The obtained data were compared with a reference standard solution and the enrichment factors (%) are reported in the table in FIG. 18 (results for the tested device are listed as "New Device" in FIG. 18). Referring to FIG. 18, the tested device showed good performance in both biological and environmental samples, leading to high enrichment factors for all tested NSAIDs.

Overall, the obtained results in Examples 1-5 show that the tested devices provided good results, showing that the device performs well in different types of matrices (likely including unconventional matrices).

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A device for extraction of one or more analytes from one or more matrices, the device comprising:

a first portion comprising a plurality of protrusions and a first section of a compartment configured to contain a magnetic stirrer; and a second portion comprising a plurality of holes or grooves and a second section of the compartment configured to contain the magnetic stirrer, the plurality of protrusions respectively corresponding to the plurality of holes or grooves to form an interlocking system to removably interlock the first portion and the second portion with each other to give a closed state of the device, the device comprising a plurality of windows configured to have a plurality of extractive materials respectively disposed therewithin when the device is in the closed state, the device further comprising the plurality of extractive materials respectively disposed within the plurality of windows, each extractive material of the plurality of extractive materials being in a form of a planar membrane, the device further comprising the magnetic stirrer disposed in the compartment, one of the first portion or the second portion comprising a raised edge around each window of the plurality of windows, the other of the first portion or the second portion comprising a depression, corresponding in size to the corresponding raised edge, around each window of the plurality of windows, the plurality of windows comprising at least six windows, the plurality of protrusions comprising at least eight protrusions, the plurality of holes or grooves comprising at least eight holes, a material of the first portion and a material of the second portion both being inert with respect to the one or more analytes and the one or more matrices, a height of the device being no more than 3.5 centimeters (cm), a maximum width of the device being no more than 3.5 cm, a maximum thickness of the device being no more than 1.1 cm, and a maximum width of each window of the plurality of windows being no more than 0.7 cm.

* * * * *